US008880008B2

(12) United States Patent
Gocho et al.

(10) Patent No.: US 8,880,008 B2
(45) Date of Patent: Nov. 4, 2014

(54) ANTENNA APPARATUS AND WIRELESS COMMUNICATION APPARATUS

(75) Inventors: Katsumi Gocho, Shizuoka-ken (JP); Hiroki Mochizuki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/554,003

(22) Filed: Jul. 20, 2012

(65) Prior Publication Data

US 2013/0029615 A1 Jan. 31, 2013

(30) Foreign Application Priority Data

Jul. 29, 2011 (JP) ................................. 2011-166746

(51) Int. Cl.
*H04B 1/38* (2006.01)
*H04M 1/00* (2006.01)
*H01Q 13/20* (2006.01)
*H01Q 1/22* (2006.01)

(52) U.S. Cl.
CPC ........... *H01Q 13/203* (2013.01); *H01Q 1/2291* (2013.01)
USPC .................... 455/90.2; 455/575.6; 455/575.7; 455/575.8

(58) Field of Classification Search
USPC ........................ 455/575.6, 575.7, 575.8, 90.2
See application file for complete search history.

(56) References Cited

U.S. PATENT DOCUMENTS 5,189,432 A * 2/1993 Lombardi et al. ............ 343/739
5,455,487 A * 10/1995 Mix et al. ...................... 315/150
2005/0099359 A1* 5/2005 Judd ............................ 343/890

FOREIGN PATENT DOCUMENTS

| | | |
|---|---|---|
| JP | 06-303016 | 10/1994 |
| JP | 08-275225 | 10/1996 |
| JP | 2004-048162 | 2/2004 |
| JP | 2005-236745 | 9/2005 |
| JP | 2005-348468 | 12/2005 |
| JP | 2008-263531 | 10/2008 |

OTHER PUBLICATIONS

First Office Action for Japanese Patent Application No. 2011-166746 Dated May 21, 2013, 7 pgs.

* cited by examiner

*Primary Examiner* — Ping Hsieh
*Assistant Examiner* — James Yang
(74) *Attorney, Agent, or Firm* — Amin, Turocy & Watson, LLP

(57) ABSTRACT

According to one embodiment, an antenna apparatus includes a leaky coaxial cable and a power supply apparatus. The power supply apparatus that provides a voltage for operating a mobile terminal receiving a radio wave radiated from the leaky coaxial cable when a high-frequency signal is provided.

2 Claims, 2 Drawing Sheets

ANTENNA APPARATUS AND WIRELESS COMMUNICATION APPARATUS

CROSS-REFERENCE TO RELATED APPLICATION

This application is based upon and claims the benefit of priority from Japanese Patent Application No. 2011-166746, filed Jul. 29, 2011, the entire contents of which are incorporated herein by reference.

FIELD

Embodiments described herein relate to an antenna apparatus and a wireless communication apparatus.

BACKGROUND

A mobile terminal conducting communication by using spot service operates by obtaining an operating voltage from a battery mounted in the mobile terminal.

DETAILED DESCRIPTION

According to one embodiment, an antenna apparatus includes a leaky coaxial cable and a power supply apparatus. The power supply apparatus that provides a voltage for operating a mobile terminal receiving a radio wave radiated from the leaky coaxial cable when a high-frequency signal is provided.

Hereinafter, one example of the embodiment is described with reference to the accompanying drawings.

Figure 1:
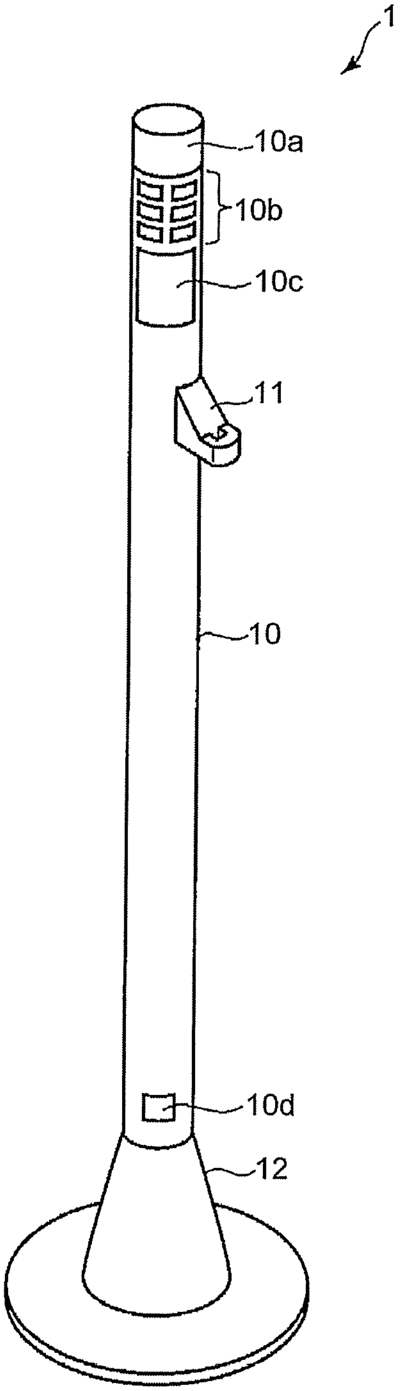
FIG. 1 is a perspective view of a wireless communication apparatus according to one embodiment.

FIG. 1 is a perspective view of a wireless communication apparatus 1 according to the embodiment.

The wireless communication apparatus 1 includes a cover 10, a power supply unit 11 and a supporting seat 12.

The cover 10 is formed to an elongated cylindrical shape. The cover 10 comprises a light-emitting window 10*a*, a group of vent holes 10*b* and a display window 10*c* respectively at its one end. The cover 10 comprises a sensor window 10*d* at its other end. The light-emitting window 10*a* transmits lights. A plurality of openings that permit the passage of air are arranged in the group of vent holes 10*b*. The display window 10*c* is a transparent window. The sensor window 10*d* transmits infrared rays. In addition, it is possible to respectively and arbitrarily alter the position and the shape of the light-emitting window 10*a*, the group of the vent holes 10*b*, the display window 10*c* and the sensor window 10*d*.

The power supply unit 11 is fixed on the lateral surface of the cover 10.

The bottom surface of the supporting seat 12 is flat, and the bottom surface contacts with a floor face at the installation site of the wireless communication apparatus 1. The supporting seat 12 retains an end of the side where the sensor window 10*d* of the cover 10 is arranged in a manner that the longitudinal direction of the cover 10 is directed toward a direction approximately perpendicular to the bottom surface of the supporting seat 12.

Figure 2:
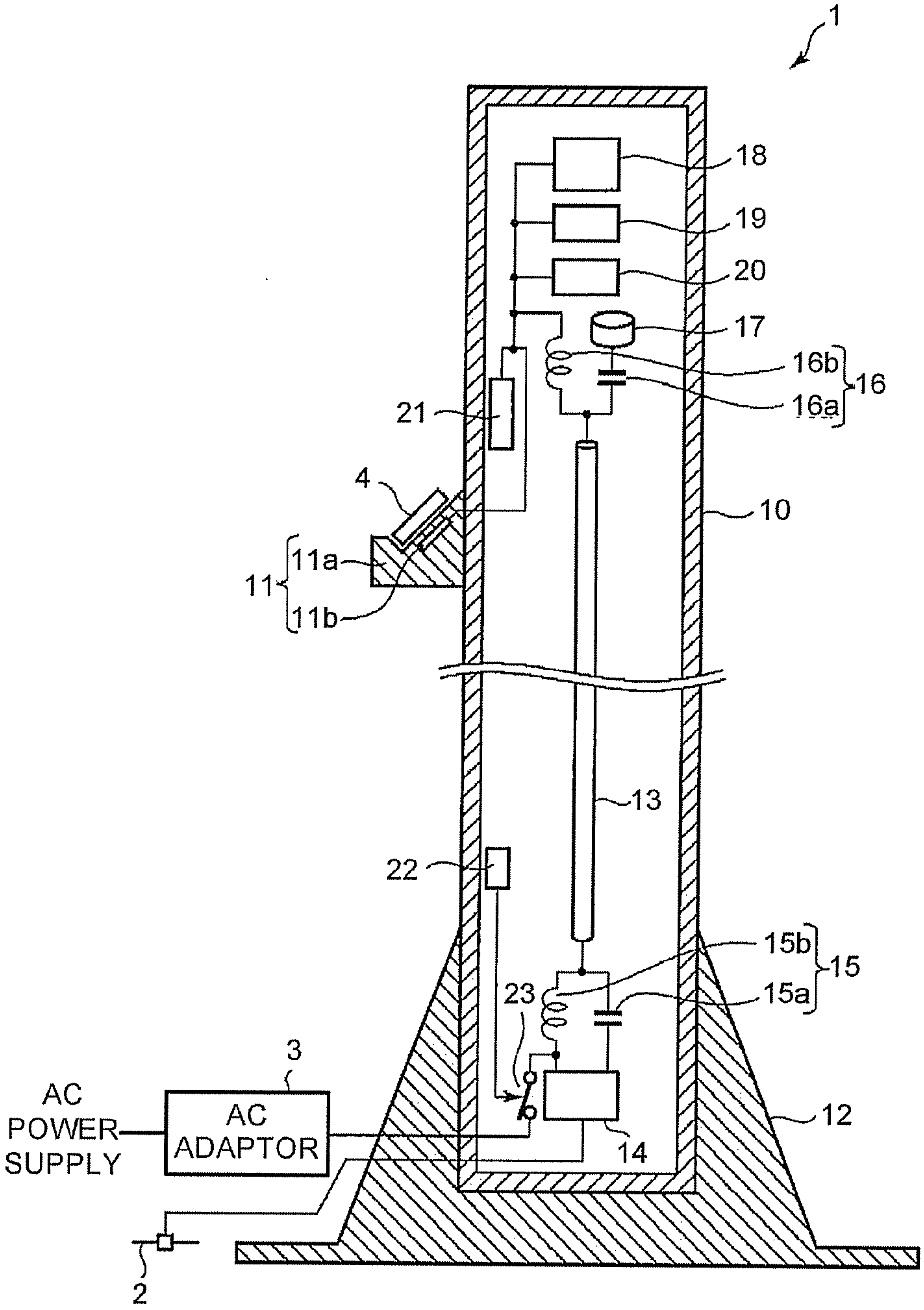
FIG. 2 is a sectional view of a portion of a wireless communication apparatus according to one embodiment.

FIG. 2 is a sectional view of a portion of the wireless communication apparatus 1. In addition, the same portion in FIG. 2 as that shown in FIG. 1 is given the same sign.

As shown in FIG. 2, the cover 10 is hollow. However, in FIG. 2, the graphic representations of the light-emitting window 10*a*, the group of vent holes 10*b*, the display window 10*c* and the sensor window 10*d* are omitted. In addition, the cover 10 has a construction for supporting the apparatus put into its interior, but their graphic representations are omitted.

Besides the cover 10, the power supply unit 11 and the supporting seat 12, the wireless communication apparatus 1 includes a leaky coaxial (LCX) cable 13, a wireless circuit 14, bias tees 15, 16, a terminator 17, a LED indicator 18, a aroma diffuser 19, a picoion generator 20, a display apparatus 21, a human sensor 22 and a power switch 23. These apparatus are put into the interior space of the cover 10. In addition, FIG. 2 schematically shows the approximate locations of each apparatus within the cover 10 and their electrical connection status.

The LCX cable 13 transmits a high-frequency signal provided from one end to the other end, and meanwhile radiates a part of the energy of this high-frequency signal as a radio wave from slots arranged at the middle portion. In addition, the LCX cable 13 transmits a high-frequency signal generated according to the surrounding electromagnetic wave. The LCX cable 13 is approximately linearly arranged along the longitudinal direction of the cover 10.

The wireless circuit 14 is connected to a communication line 2 such as LAN (local area network) line etc. The wireless circuit 14 generates a high-frequency signal for wirelessly transmitting a transmitted data sent from the LCX cable 13 via the communication line 2. In addition, the wireless circuit 14 extracts the transmitted data from the high-frequency signal generated in the LCX cable 13 and delivers the data to the communication line 2. Via a power switch 23 the wireless circuit 14 provides a direct current voltage generated from an AC power-supply and an AC adapter 3, and the wireless circuit 14 operates by using the direct current voltage as the operating voltage.

The bias tee 15 includes a capacitor 15*a* and an inductor 15*b*. One end of the capacitor 15*a*, one end of the inductor 15*b* and a first end of the LCX cable 13 are connected with each other. The other end of the capacitor 15*a* is connected to input and output terminal for the high-frequency signal of the wireless circuit 14. The direct current voltage output by the AC adapter 3 is provided to the other end of the inductor 15*b* via the power switch 23.

The bias tee 16 includes a capacitor 16*a* and an inductor 16*b*. One end of the capacitor 16*a*, one end of the inductor 16*b* and a second end of the LCX cable 13 are connected with each other. The other end of the capacitor 16*a* is connected to the terminator 17. The other end of the inductor 16*b* is connected to the respective power terminals of the LED indicator 18, the aroma diffuser 19, the picoion generator 20 and the display apparatus 21, and to the power supply unit 11.

The terminator 17 is typically an electric resistor, the terminator 17 fits the impedance of the second end of the LCX cable 13 together, and minimizes the reflection of the high-frequency signal at the second end.

The LED indicator 18 includes a LED (light emitting diode) as a light source, and it is arranged in a manner of emitting the light emitted by the LED to the exterior of the cover 10 from the light-emitting window 10*a*. The LED indicator 18 indicates the operating condition of the wireless communication apparatus 1 etc. by altering the light-emitting state.

The aroma diffuser 19 generates compounds with fragrance.

The picoion generator 20 generates fine ions.

The air containing the compounds generated by the aroma diffuser 19 and ions generated by the picoion generator 20 is released to the exterior of the cover 10 through the group of vent holes 10*b*.

The display apparatus 21 displays any image, motion picture, and characters etc. The display apparatus 21 is arranged as its display surface being directed toward the display window 10*c*. The displayed image, motion picture, and characters etc. can be seen from the exterior of the cover 10 through the display window 10*c*. For the display apparatus 21, the well-known display apparatus such as liquid-crystal display apparatus (LCD) etc. can be used.

The human sensor 22 detects an existing person being close to the wireless communication apparatus 1 by the infrared rays. The human sensor 22 outputs a detected signal that shows whether a person is detected. The human sensor 22 can also be replaced by a apparatus that detects a person by for example ultrasonic wave except infrared rays.

The power switch 23 turns on or off according to the detected sign output by the human sensor 22.

The power supply unit 11 is configured by putting a feed circuit 11*b* into the interior of the holder 11*a*.

The holder 11*a*, as shown in FIG. 2, has a shape that can carry a mobile terminal 4.

The feed circuit 11*b* operates with a direct current voltage provided from the bias tee 16, and supplies power to the mobile terminal 4 carried by the holder 11*a*. The feed circuit 11*b* is preferably a well-known non-contact feed circuit that supplies power with electromagnetic wave. However, for the feed circuit 11*b*, a feed circuit that is connected to the mobile terminal 4 by contacting a contact point arranged in the holder 11*a* with a contact point arranged in the mobile terminal 4, or a feed circuit that is connected to the mobile terminal 4 via a cable can also be applied. The feed circuit 11*b* corresponding to a plurality of manner of these manners can also be applied.

Then, the operation of the wireless communication apparatus 1 configured as above will be described.

If a person comes close to the wireless communication apparatus 1 and the human sensor 22 detects it, the power switch 23 turns on. Thus, a direct current voltage output by the AC adapter 3 is provided to the wireless circuit 14, and the wireless circuit 14 operates.

The high-frequency signal output from the input and output terminal of the wireless circuit 14 passes through the capacitor 15*a*, but does not pass through the inductor 15*b*. On the other hand, the direct current voltage output by the AC adapter 3 passes through the inductor 15*b*, but does not pass through the capacitor 15*a*. Thus, a transmitted signal formed by superimposing a direct current voltage onto a high-frequency signal is generated by the bias tee 15. That is to say, the bias tee 15 functions as a superimposing circuit.

If a transmitted signal is provided from the bias tee 15 to the first end, the LCX cable 13 transmits the transmitted signal toward the second end, and meanwhile radiates a part of the energy of the high-frequency signal included in the transmitted signal as a radio wave. In addition, the part of the high-frequency signal being included in the transmitted signal and not radiated as the radio wave passes through the capacitor 16*a* within the bias tee 16 and is terminated by the terminator 17. On the other hand, a high-frequency signal generated in the LCX cable 13 by the electromagnetic wave around the LCX cable 13 passes through the capacitor 15*a* within the bias tee 15, and it is provided to the input and output terminal of the wireless circuit 14. Thus, the mobile terminal 4 close to the wireless communication apparatus 1 can access the communication line 2 via the wireless communication apparatus 1. That is to say, the wireless communication apparatus 1 functions as a wireless access point.

On the other hand, the direct current voltage included in the transmitted signal passes through the inductor 16*b* of the bias tee 16, and it is provide to the power terminal of the LED indicator 18, the aroma diffuser 19, the picoion generator 20 and the display apparatus 21. Thus, the LED indicator 18, the aroma diffuser 19, the picoion generator 20 and the display apparatus 21 operate by providing an operating voltage to them. In this way, the bias tee 16 isolates the high-frequency signal and the direct current voltage from the transmitted signal, and it functions as an isolating circuit.

In addition, the direct current voltage passing through the inductor 16*b* is also provided to the feed circuit lib. Therefore, if the mobile terminal 4 is carried by the holder 11*a*, the feed circuit 11*b* supplies power to the mobile terminal 4. That is to say, the feed circuit 11*b* functions as a power supply apparatus.

Then, the high-frequency signal is blocked by the inductors 15*b*, 16*b*, and it is not provided to the power terminal of the wireless circuit 14, the LED indicator 18, the aroma diffuser 19, the picoion generator 20 and the display apparatus 21, and to the feed circuit lib, and the output terminal of the AC adapter 3. Therefore, the supply voltage to the wireless circuit 14, the LED indicator 18, the aroma diffuser 19, the picoion generator 20, the display apparatus 21 and the feed circuit lib is maintained constant, thus abnormal operation due to a power supply variation caused by the high-frequency signal will not occur. In addition, a high-frequency signal is not input to the output terminal of the AC adapter 3, thus a fault caused by the high-frequency signal will not occur in the AC adapter 3.

In accordance with the embodiment as above, the mobile terminal 4 can receive the power supply from the wireless communication apparatus 1, and meanwhile access the communication line 2 via the wireless communication apparatus 1. Thus, the case that the communication cannot continue due to battery shutoff of the mobile terminal 4 can be prevented.

In addition, in the embodiment, the power supply unit 11 is more close to the second end than the first end of the LCX cable 13. If a direct current voltage is provided to the power supply unit 11 via a power supply cable, the power supply cable must be put into the interior space of the cover 10 in parallel with the LCX cable 13. However, in the wireless communication apparatus 1, the power supply cable for providing the operating voltage to the power supply unit 11 can be arranged in the LCX cable 13 without being parallel to the LCX cable 13, thus the interior space of the cover 10 can be in good order.

So, if the mobile terminal 4 has a function of recharging the battery by power supply from the feed circuit 11*b*, the power supply unit 11 can also be used in battery recharge of the mobile terminal 4. However, if the communication via the wireless communication apparatus 1 is not conducted and the mobile terminal 4 is being put in the holder 11*a* only for the purpose of battery recharge, the power supply to another mobile terminal 4 conducting communication via the wireless communication apparatus 1 can not be conducted. However, in the wireless communication apparatus 1, when a person is not in the neighborhood of the wireless communication apparatus 1, the supply of the direct current voltage to the bias tee 15 is disconnected, thus the power supply to the mobile terminal 4 from the feed circuit 11*b* is also disconnected. Therefore, the user of the mobile terminal 4 only for the purpose of battery recharge needs to be in the neighborhood of wireless communication apparatus 1 during recharging, thus the case that the mobile terminal 4 only for the purpose of battery recharge is put in the holder 11*a* can be prevented.

The embodiment can be implemented in form of various variations as follow.

The embodiment can also be implemented as an antenna apparatus without the wireless circuit 14.

A direct current voltage may also provide to the wireless circuit 14 without the power switch 23.

The human sensor 22 and the power switch 23 may also be put into the wireless communication apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna apparatus, comprising:

a leaky coaxial cable;

a superimposing circuit that provides a transmitted signal obtained by superimposing a high-frequency signal with a direct current voltage to a first end of the leaky coaxial cable;

an isolating circuit that is connected to a second end of the leaky coaxial cable and isolates the direct current voltage from the transmitted signal before being transmitted by the leaky coaxial cable;

a holder that holds a mobile terminal receiving a radio wave radiated from the leaky coaxial cable when the high-frequency signal is provided, the mobile terminal having a function of charging a battery by external power supply;

a power supply apparatus that provides the direct current voltage isolated by the isolating circuit to the mobile terminal as a voltage for operating the mobile terminal held by the holder;

a human sensor which detects a proximity of a person; and switch which disconnects supply of the direct current voltage to the mobile terminal from the power supply apparatus when the proximity is not detected by the human sensor, regardless of whether the mobile terminal is held by the holder or not.

2. A wireless communication apparatus, comprising:

a leaky coaxial cable;

a wireless circuit that generates a high-frequency signal for wireless communication;

a superimposing circuit that provides a transmitted signal obtained by superimposing a high-frequency signal with a direct current voltage to a first end of the leaky coaxial cable;

an isolating circuit that is connected to a second end of the leaky coaxial cable and isolates the direct current voltage from the transmitted signal before being transmitted by the leaky coaxial cable;

a holder that holds a mobile terminal receiving a radio wave radiated from the leaky coaxial cable when the high-frequency signal is provided, the mobile terminal having a function of charging a battery by external power supply;

a power supply unit that provides a direct current voltage isolated by an isolating circuit to a mobile terminal as a voltage for operating the mobile terminal held by a holder;

a human sensor which detects a proximity of a person; and a switch which disconnects supply of the direct current voltage to the mobile terminal form the power supply apparatus when the proximity is not detected by the human sensor, regardless of whether the mobile terminal is held by the holder or not.

* * * * *